(12) United States Patent
Gruenstein et al.

(10) Patent No.: US 10,847,160 B2
(45) Date of Patent: Nov. 24, 2020

(54) USING TWO AUTOMATED SPEECH RECOGNIZERS FOR SPEECH RECOGNITION

(71) Applicant: Google LLC, Mountain View, CA (US)

(72) Inventors: Alexander H. Gruenstein, Mountain View, CA (US); Petar Aleksic, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 73 days.

(21) Appl. No.: 15/912,780

(22) Filed: Mar. 6, 2018

(65) Prior Publication Data

US 2018/0197543 A1 Jul. 12, 2018

Related U.S. Application Data

(63) Continuation of application No. 13/838,379, filed on Mar. 15, 2013, now Pat. No. 10,354,650.

(Continued)

(51) Int. Cl.
*G10L 15/30* (2013.01)
*G10L 15/26* (2006.01)
(Continued)

(52) U.S. Cl.
CPC .............. *G10L 15/26* (2013.01); *G10L 15/18* (2013.01); *G10L 15/22* (2013.01); *G10L 15/30* (2013.01);
(Continued)

(58) Field of Classification Search
CPC .............................. G10L 15/30; G10L 15/183
(Continued)

(56) References Cited

U.S. PATENT DOCUMENTS 6,446,076 B1 9/2002 Burkey et al.
6,999,930 B1 2/2006 Roberts et al.
(Continued)

FOREIGN PATENT DOCUMENTS

EP 0736211 B1 3/2004

OTHER PUBLICATIONS

Office Action issued in European Application No. 13734936.1, dated May 25, 2018, 4 pages.
(Continued)

*Primary Examiner* — Michael N Opsasnick
(74) *Attorney, Agent, or Firm* — Honigman LLP; Brett A. Krueger

(57) ABSTRACT

A method includes receiving audio data corresponding to an utterance and generating, by an automated speech recognizer, a personalized transcription associated with a voice action. The personalized transcription includes one or more of one or more terms that are not included in a vocabulary of a cloud-based automated speech recognizer. The method also includes transmitting the audio data to the cloud-based automated speech recognizer. The cloud-based automated speech recognizer is configured to generate a mistranscription of the utterance and transmit the mistranscription of the utterance to a mobile computing device or a digital assistant device. When the mistranscription of the utterance includes a term associated with the voice action, the method also includes providing a search results page that includes a control for initiating the voice action and one or more search results that are generated based on the mistranscription of the utterance generated by the cloud-based automated speech recognizer.

18 Claims, 6 Drawing Sheets

Related U.S. Application Data

(60) Provisional application No. 61/664,324, filed on Jun. 26, 2012.

(51) Int. Cl.
   *G10L 15/18* (2013.01)
   *G10L 15/22* (2006.01)
   *G10L 15/32* (2013.01)
   G10L 15/193 (2013.01)
   G10L 15/197 (2013.01)

(52) U.S. Cl.
   CPC ............ *G10L 15/32* (2013.01); *G10L 15/193* (2013.01); *G10L 15/197* (2013.01)

(58) Field of Classification Search
   USPC ........................................................ 704/255
   See application file for complete search history.

(56) References Cited

U.S. PATENT DOCUMENTS

| | | |
|---|---|---|
| 7,003,463 B1 | 2/2006 | Maes et al. |
| 7,013,265 B2 | 3/2006 | Huang et al. |
| 7,013,275 B2 | 3/2006 | Arnold et al. |
| 7,085,723 B2 | 8/2006 | Ross et al. |
| 7,225,130 B2 | 5/2007 | Roth et al. |
| 7,277,853 B1 | 10/2007 | Bou-Ghazale et al. |
| 7,302,383 B2 | 11/2007 | Valles |
| 7,328,155 B2 | 2/2008 | Endo et al. |
| 7,720,682 B2 | 5/2010 | Stephanick et al. |
| 7,752,152 B2 | 7/2010 | Paek et al. |
| 7,769,142 B2 | 8/2010 | Selbie et al. |
| 7,881,936 B2 | 2/2011 | Longe et al. |
| 8,126,715 B2 | 2/2012 | Paek |
| 8,204,746 B2 | 6/2012 | Odinak |
| 8,311,835 B2 | 11/2012 | Lecoeuche |
| 8,332,218 B2 | 12/2012 | Cross et al. |
| 8,346,549 B2 | 1/2013 | Ljolje et al. |
| 8,838,457 B2 | 9/2014 | Cerra et al. |
| 8,880,405 B2 | 11/2014 | Cerra et al. |
| 8,996,379 B2 | 3/2015 | Cerra et al. |
| 2002/0032564 A1 | 3/2002 | Ehsani et al. |
| 2002/0123891 A1 | 9/2002 | Epstein |
| 2003/0120493 A1* | 6/2003 | Gupta .................. G10L 15/063 704/270.1 |
| 2003/0182131 A1 | 9/2003 | Arnold et al. |
| 2004/0019488 A1 | 1/2004 | Portillo |
| 2004/0043758 A1 | 3/2004 | Sorvari et al. |
| 2004/0083092 A1 | 4/2004 | Valles |
| 2004/0193401 A1 | 9/2004 | Ringger et al. |
| 2004/0199375 A1 | 10/2004 | Ehsani et al. |
| 2005/0017954 A1 | 1/2005 | Kay et al. |
| 2005/0055210 A1 | 3/2005 | Venkataraman et al. |
| 2005/0175169 A1 | 8/2005 | Boda |
| 2005/0203740 A1 | 9/2005 | Chambers et al. |
| 2005/0246325 A1 | 11/2005 | Pettinati et al. |
| 2006/0009980 A1 | 1/2006 | Burke et al. |
| 2006/0069564 A1 | 3/2006 | Allison et al. |
| 2006/0167686 A1 | 7/2006 | Kahn |
| 2007/0043566 A1* | 2/2007 | Chestnut .............. G10L 15/075 704/257 |
| 2007/0208555 A1 | 9/2007 | Blass et al. |
| 2008/0270135 A1 | 10/2008 | Goel et al. |
| 2008/0288252 A1 | 11/2008 | Cerra et al. |
| 2009/0030696 A1* | 1/2009 | Cerra ...................... G10L 15/30 704/275 |
| 2009/0030697 A1* | 1/2009 | Cerra .................... G10L 15/183 704/275 |
| 2009/0204409 A1 | 8/2009 | Mozer et al. |
| 2009/0326937 A1 | 12/2009 | Chitsaz et al. |
| 2010/0088344 A1* | 4/2010 | Treat .................. G06F 16/9535 707/794 |
| 2010/0169098 A1* | 7/2010 | Patch ............................ 704/275 |
| 2010/0191520 A1 | 7/2010 | Gruhn et al. |
| 2011/0015928 A1 | 1/2011 | Odell et al. |
| 2011/0054894 A1 | 3/2011 | Phillips et al. |
| 2011/0054896 A1 | 3/2011 | Phillips et al. |
| 2011/0054900 A1* | 3/2011 | Phillips .................. G10L 15/30 704/235 |
| 2011/0055256 A1* | 3/2011 | Phillips .................. G10L 15/30 707/769 |
| 2011/0060587 A1* | 3/2011 | Phillips .................. G10L 15/30 704/235 |
| 2011/0066634 A1* | 3/2011 | Phillips .................. G10L 15/22 707/769 |
| 2011/0143731 A1 | 6/2011 | Ramer et al. |
| 2011/0144996 A1* | 6/2011 | Ma ...................... G06F 17/2765 704/251 |
| 2011/0185740 A1 | 7/2011 | Gruenstein et al. |
| 2011/0202341 A1* | 8/2011 | Brown .................... G10L 15/19 704/239 |
| 2011/0295603 A1 | 12/2011 | Meisel et al. |
| 2012/0101809 A1* | 4/2012 | Kennewick ........ G06Q 30/0261 704/9 |
| 2012/0117101 A1* | 5/2012 | Unruh .................. G06F 3/0237 707/765 |
| 2012/0179457 A1 | 7/2012 | Newman et al. |
| 2012/0179469 A1 | 7/2012 | Newman et al. |
| 2012/0215539 A1 | 8/2012 | Juneja |
| 2013/0030804 A1* | 1/2013 | Zavaliagkos ........... G10L 15/26 704/235 |

OTHER PUBLICATIONS

Everitt, Katherine M. et al., "Disambiguating Speech Commands Using Physical Context," ICMI '07, Proceedings of the 9th International Conference on Multimodal Interfaces, 8 pages.

Hakkani-Tur, Dilek et al., "Unsupervised and Active Learning in Automatic Speech Recognition for Call Classification," Proceedings (ICAASP '04) IEEE International Conferences on Acoustics, Speech, and Signal Processing, 2004, 4 pages.

International Preliminary Report on Patentability in International Application No. PCT/US2013/047780, dated Jan. 8, 2015, 8 pages.

International Search Report and Written Opinion in PCT/US2013/047780, dated Aug. 23, 2013, 10 pages.

Office Action in European Application No. 13734936.1, dated Aug. 24, 2016, 6 pages.

Office Action in Chinese Application No. 2013800416415, dated Dec. 5, 2016, 8 pages (English translation) (no new art).

Office Action in Chinese Application No. 201380041641.5, dated Jul. 24, 2017, 12 pages (With English Translation).

Office Action in Chinese Application No. 201380041641.5, dated Jan. 10, 2018, 12 pages (with English translation).

Extended European Search Report in European Appln No. 19168323.4, dated Jul. 12, 2019, 11 pages.

* cited by examiner

USING TWO AUTOMATED SPEECH RECOGNIZERS FOR SPEECH RECOGNITION

CROSS-REFERENCE TO RELATED APPLICATION

This application is a continuation of U.S. application Ser. No. 13/838,379, filed Mar. 15, 2013, which claims the benefit of U.S. Provisional Application Ser. No. 61/664,324, filed on Jun. 26, 2012, which is incorporated by reference.

BACKGROUND

This specification relates to speech recognition.

A user of a mobile device may enter text by, for example, typing on a keyboard or speaking into a microphone. In the context of voice input, an Automated Search Recognition (ASR) engine may be used to process input in the form of speech.

SUMMARY

In general, one innovative aspect of the subject matter described in this specification can be implemented in methods that include a computer-implemented method for providing sound transcription. The method comprises accessing audio data generated by a computing device based on audio input from a user, the audio data encoding one or more user utterances. The method further comprises generating a first transcription of the utterances by performing speech recognition on the audio data using a first speech recognizer, wherein the first speech recognizer employs a language model that is based on user-specific data. The method further comprises generating a second transcription of the utterances by performing speech recognition on the audio data using a second speech recognizer, wherein the second speech recognizer employs a language model independent of user-specific data. The method further comprises determining that the second transcription of the utterances includes a term from a predefined set of one or more terms. The method further comprises, based on determining that the second transcription of the utterance includes the term from the predefined set of one or more terms, providing an output of the first transcription of the utterance.

These and other implementations can each optionally include one or more of the following features. The set of one or more terms can be associated with one or more actions to be performed by the computing device. The first speech recognizer can employ a grammar-based language model. The grammar-based language model can include a context free grammar. The second speech recognizer can employ a statistics-based language model. The user-specific data can include a contact list for the user, an applications list of applications installed on the computing device, or a media list of media stored on the computing device. The first speech recognizer can be implemented on the computing device and the second speech recognizer is implemented on one or more server devices.

In general, another innovative aspect of the subject matter described in this specification can be implemented in systems that include a system for providing sound transcription. The system comprises one or more computers and one or more storage devices storing instructions that are operable, when executed by the one or more computers, to cause the one or more computers to perform operations comprising: accessing audio data generated by a computing device based on audio input from a user, the audio data encoding one or more user utterances; generating a first transcription of the utterances by performing speech recognition on the audio data using a first speech recognizer, wherein the first speech recognizer employs a language model that is developed based on user-specific data; generating a second transcription of the utterances by performing speech recognition on the audio data using a second speech recognizer, wherein the second speech recognizer employs a language model developed independent of user-specific data; determining that the second transcription of the utterances includes a term from a predefined set of one or more terms; and, based on determining that the second transcription of the utterance includes the term from the predefined set of one or more terms, providing an output of the first transcription of the utterance.

These and other implementations can each optionally include one or more of the following features. The set of one or more terms can be associated with one or more actions to be performed by the computing device. The first speech recognizer can employ a grammar-based language model. The grammar-based language model can include a context free grammar. The second speech recognizer can employ a statistics-based language model. The user-specific data can include a contact list for the user, an applications list of applications installed on the computing device, or a media list of media stored on the computing device. The first speech recognizer can be implemented on the computing device and the second speech recognizer can be implemented on one or more server devices.

In general, another innovative aspect of the subject matter described in this specification can be implemented in computer-readable medium that include a computer-readable medium storing software comprising instructions executable by one or more computers which, upon such execution, cause the one or more computers to perform operations. The operations comprise accessing audio data generated by a computing device based on audio input from a user, the audio data encoding one or more user utterances; determining a first transcription of the utterances by performing speech recognition on the audio data using a first speech recognizer, wherein the first speech recognizer employs a language model that is developed based on user-specific data; determining a second transcription of the utterances by performing speech recognition on the audio data using a second speech recognizer, wherein the second speech recognizer employs a language model developed independent of user-specific data; determining that the second transcription of the utterances includes a term from a predefined set of one or more terms; and, based on determining that the second transcription of the utterance includes the term from the predefined set of one or more terms, providing an output of the first transcription of the utterance.

These and other implementations can each optionally include one or more of the following features. The set of one or more terms can be associated with one or more actions to be performed by the computing device. The first speech recognizer can employ a grammar-based language model. The second speech recognizer can employ a statistics-based language model. The user-specific data can include a contact list for the user, an applications list of applications installed on the computing device, or a media list of media stored on the computing device. The first speech recognizer can be implemented on the computing device and the second speech recognizer is implemented on one or more server devices.

The details of one or more implementation of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
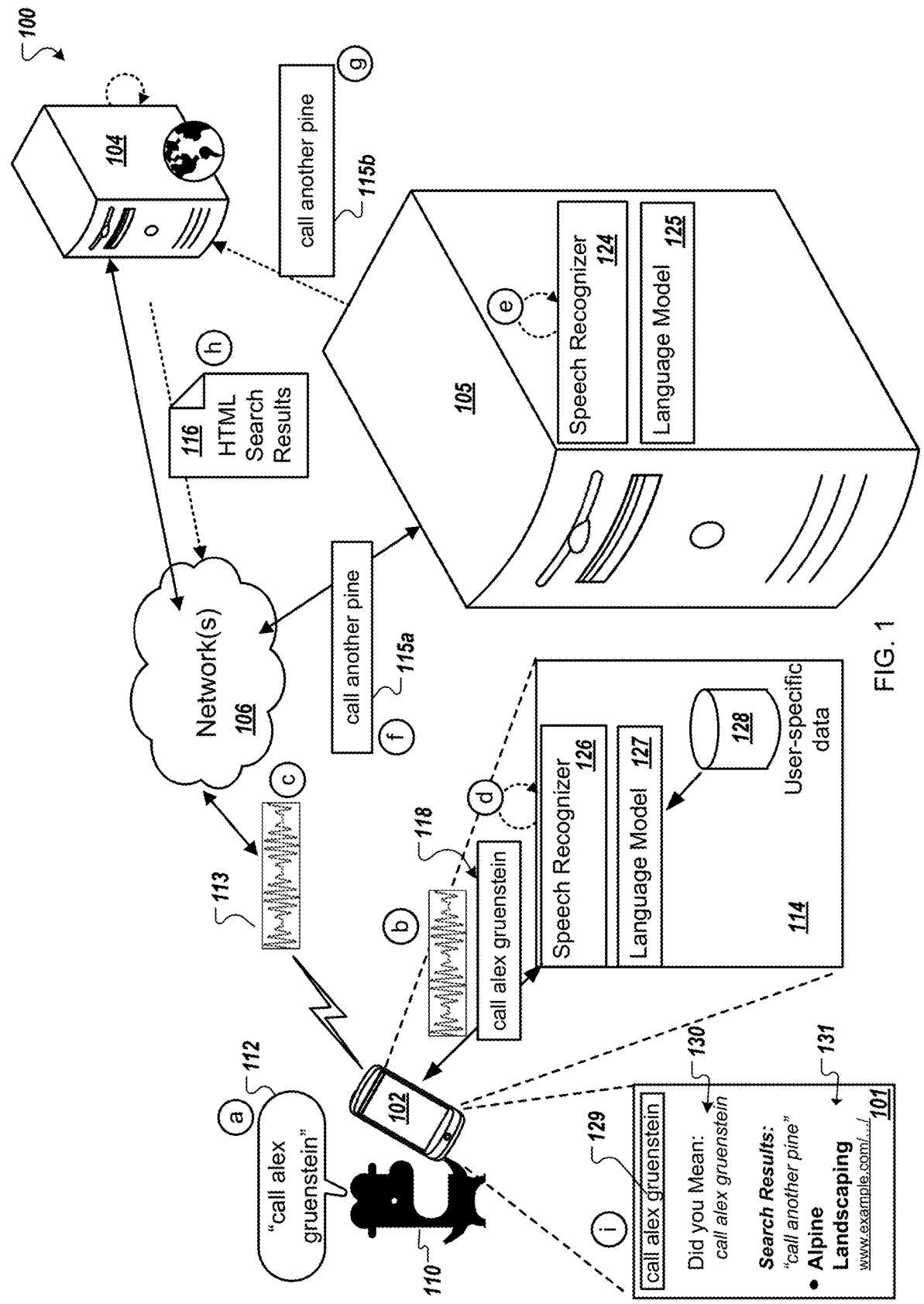
FIG. 1 is a diagram of an example of a system that employs the different capabilities of two speech recognizers.

FIG. 1 is a diagram of an example of a system 100 that employs the different capabilities of two speech recognizers to, for example, enhance speech recognition accuracy. FIG. 1 also illustrates a flow of data within the system 100 during states (a) to (i), as well as a user interface 101 that is displayed on a mobile device 102 of the system 100 during state (i). Briefly, the system 100 processes user utterances on both a client-side and a server-side speech recognizer, which may help to resolve ambiguities caused by user-specific words or names in the utterances. For example, the client-side speech recognizer may use a limited language model that is developed using user specific data, such as the contact names in the user's contact list, while the server-side speech recognizer uses a large vocabulary language model developed independently of such user-specific data. In this case, comparing or combining the results of both speech recognizers may be used to increase accuracy when the utterances involve user-specific terms.

In more detail, the system 100 includes the mobile device 102, which is in communication with a server 104 and an ASR engine 105 over one or more networks 106. ASR engine 105 may be implemented on server 104 or on a separate computing device and in communication with server 104 and mobile device 102 over the one or more networks 106. The server 104 may be a search engine, a dictation engine, a dialogue system, or any other engine or system that uses transcribed speech or that invokes a software application that uses transcribed speech, to perform some action. In general, the following description uses the example of a search engine for server 104. The networks 106 may include a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof. The states (a) through (i) depict a flow of data that occurs when an example process is performed by the system 100. The states (a) to (i) may be time-sequenced states, or they may occur in a sequence that is different than the illustrated sequence.

The mobile device 102 may be, for example, a cellular telephone, a smartphone, a tablet computer, or a personal digital assistant (PDA). The mobile device 102 implements a local ASR engine 114 including the client-based speech recognizer 126. In addition, the client-based speech recognizer 126 uses user-specific data 128 saved on the mobile device 102 to develop its language model 127. User-specific data 128 may include, for example, contact lists, phone numbers, addresses, applications, digital photographs, audio media, or video media. The following description uses a contact list as an example of the user-specific data 128.

By incorporating the user-specific data 128 into the language model 127, the client-based speech recognizer 126 may be able to more accurately distinguish unique words and names describing the data such as a friend's name, "Alex Gruenstein," or the name of a favorite artist, "Lynyrd Skynyrd." In one example, the language model may be a context-free grammar that can support simple voice actions and incorporate the user-specific data pertaining to a particular action.

ASR engine 105 incorporates a server-based speech recognizer 124 that uses language model 125. Language model 125 may be a large vocabulary statistical language model capable of transcribing complex user dictations, and may be designed to handle transcriptions over a large number of users. However, in some situations, the language model 124 may not have access to the user-specific data and therefore may not perform speech recognition related to such data as well as the ASR engine 114. The language model 124 may not have access to user-specific data, for example, because of either privacy concerns or data and bandwidth limitation of the system when storing data associated with millions of users. To determine the ASR engine 105 transcription, the server-based speech recognizer 124 may generate one or more candidate transcriptions that match the utterance encoded in the audio data 112, and speech recognition confidence values for the candidate transcriptions. The transcription with the highest confidence value may be selected as the ASR engine 105 transcription. Other techniques may be used to select which candidate transcription to use as the server transcription.

Other implementations may incorporate both ASR engine 105 and ASR engine 114 on the same computing device. Such a computing device may be one or more servers, a desktop computer, a laptop computer, a tablet computer, a mobile telephone, or a smart phone. Some implementations may combine the ASR engines 105 and 114 into a single ASR engine having both a large statistical language model and a context-free grammar incorporating user-specific data 128. Further, speech recognition process by each of the described ASR engines may be performed simultaneously, at substantially the same time, or in a parallel manner.

In some implementations, the system 100 employs speech recognition to determine whether speech input is a voice command or a voice search query, and then act accordingly. A voice command may be considered a user utterance that is received by a speech recognition device and causes the device to perform a task. The voice command may be recognized by the inclusion, in the utterance, of a word or phrase describing an action that is performable by the device, for example "call." In some cases, the voice action may be described by multiple variations of such action. For example variations on the action "call" incorporating user data may be "call Alex Gruenstein," "call Alex Gruenstein at home," or "please dial 555-321-4567." Alternative types of commands may be to play, pause, or stop audio or video media; open or close an application; send, open, delete or save and e-mail or SMS, get a map, directions or otherwise navigate to a location; open, zoom, save, or capture a digital photograph; set, stop, or start an alarm or timer; or to set or schedule a reminder or a task.

A voice search query may be considered a user utterance that is received by a speech recognition device and causes the device to perform a search based on a transcription of the utterance. The search may be a web search, an address search, a telephone directory search, a map search, or any other type of search. Such an utterance may be distinguished from a voice command by the lack of a word or phrase relating to an action performable by a mobile device or by the inclusion of certain words or phrases indicative of a search query, for example "search . . . ," "what is . . . ," "where is . . . " In the context of a voice search query system, a "search query" includes one or more query terms that a user submits to a search engine when the user requests the search engine to execute a search query, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

The system 100 determines transcriptions of the audio data 113 using both ASR engine 105 and ASR engine 114 and those transcriptions are examined to determine whether to perform a voice command or a voice search. For example, in one case, the transcriptions are examined to determine, for example, that the transcription 115a received from ASR engine 105 represents a search query and transcription 118 from ASR engine 114 represents an action. Transcription 115a is then further examined to determine that the text of the search query contains a word or phrase contained in a pre-determined set of terms indicating an action performable on a mobile device 102. Transcription 115a is thereby used to confirm the action of transcription 118. The system 100 may then prefer transcription 118 based on the access that language model 127 has to user-specific data 128 required to perform the action. The system 100 then either requests user confirmation of the received transcriptions, request confirmation of the action before initiating performance, or initiates performance of the action without user confirmation. The example described relates to the performance of speech recognition for voice commands and search queries, however, the system 100 may be used to implement speech recognition for voice commands and dictations or voice commands and any other non-command transcriptions.

The process illustrated in FIG. 1 shows a more particular example of the operation of system 100. In this example, a user 110 speaks an utterance 112 into the mobile device 102. In general, the mobile device 102 receives the utterance 112 and records it as audio data 113. ASR engine 114 generates a first transcription 118 of the audio data 113. In addition, the mobile device 102 communicates the audio data 113 to the ASR engine 105 where a second transcription 115a is generated. The second transcription 115a is communicated to the mobile device 102 where it is compared with the first transcription to determine the proper result.

In more detail, during state (a), a user 110 speaks one or more utterances 112 to the mobile device 102, which records the utterances 112 and generates corresponding audio data 113. For example, the user 110 may wish to call a friend (for example, Alex Gruenstein), who's telephone number is stored in the user-specific data 128 on the user's 110 mobile device 102. The user-specific data 128 may contain, for example, the user's contacts, applications, and various forms of audio or video media. When the user 110 speaks "call Alex Gruenstein" into his mobile device 102 it records the utterance 112 and generates the corresponding audio data 113. In addition to including the utterance 112, the audio data 113 may also include a snippet of environmental audio, such as a two second snippet of audio that was recorded before or after the utterance 112 was spoken. While the utterance 112 is described as illustrated in FIG. 1 as a voice command, in other example implementations the utterance 112 may be a voice input to a search query, to a dictation system, or to a dialog system.

During state (b), the audio data 113 is provided to the ASR engine 114 on the mobile device 102 to be processed. Additionally, during state (c), the mobile device 102 communicates the audio data 113 to ASR engine 105 over the networks 106 to be processed.

During state (d), the client-based speech recognizer 126 of the client-based ASR engine 114 performs speech recognition on the audio data 113 using language model 127 to determine a client transcription of the audio data 113. In the example shown, the first transcription 118 is an action ("call Alex Gruenstein") to be carried out by the mobile device 102. As noted above, the language model 127 may be a context-free grammar that can support simple voice actions including variations on the voice actions and incorporates user-specific data 128. For example variations on the action "call" incorporating user data may be "call Alex Gruenstein," "call Alex Gruenstein at home," or "please dial 555-321-4567." Certain terms in the voice actions and variations (for example, "call" or "please dial") may be considered a set of predefined terms, recognizable by the client-based speech recognizer 126.

During state (e), the server-based speech recognizer 124 performs speech recognition on the audio data 113 using language model 125 to determine a second transcription 115a of the audio data 113. As noted above, the language model 125 may be a large vocabulary statistical language model capable of transcribing complex user dictations. Additionally, the ASR engine 105 may classify the utterance 112 as either an action to be performed by the mobile device 102 or a text string to be used as a search query or as a transcribed dictation. After performing the second transcription 115a, ASR engine 124 makes the preliminary determination as to whether the produced second transcription 115a is an action or a search query. The determination may result in one of three possible classifications. First, the ASR engine 105 may determine that the second transcription 115a does contain an action performable by the mobile device 102 and is therefore a voice command and would be communicated to the mobile device 102 as such. Second, the ASR engine 105 may determine that the second transcription 115a does not contain an action and is therefore a search query. If this is the case the ASR engine may communicate either the second transcription 115a along with search results or only search results to the mobile device 102. Third, the ASR may be unable to determine whether the second transcription is an action or a search query and may communicate either the second transcription 115a alone or the second transcription 115a and search results to the mobile device 102.

The classification discussed above may be made using confidence values associated with the produced transcription in association with threshold values for the set of decisions to be made by the ASR engine 105.

During state (f), the second transcription 115*a* ("call another pine") generated by the server-based speech recognizer 124 is communicated from the ASR engine 105 to the mobile device 102. In the example shown, the server-based speech recognizer 124 has mistakenly transcribed the audio data 113 as "call another pine." In this example, ASR engine 105 can neither distinguish the second transcription 115*a* as a query nor as an action. Therefore, it is communicated to the mobile device 102 as a text string to be displayed with, for example, search results.

During state (g), second transcription 115*b* ("call another pine") generated by the server-based speech recognizer 124 is communicated from the ASR engine 105 to the server 104. When the server 104 is a search engine and the server-based speech recognizer 124 determines the utterance to be a search query, the candidate transcriptions 115 may be used as a search query term by the search engine to execute one or more search queries. The ASR engine 105 may provide multiple candidate transcriptions 115*b* and rank the candidate transcriptions 115*b* based at least on their respective speech recognition confidence scores before transmission to the server 104. By transcribing spoken utterances and providing candidate transcriptions to the server 104, the ASR engine 105 may provide a voice search query capability, a dictation capability, or a dialogue system capability to the mobile device 102.

The server 104 may execute one or more search queries using the candidate query terms, and may generate a file 116 that references search result 131. The file 116 may be a markup language file, such as an eXtensible Markup Language (XML) or HyperText Markup Language (HTML) file.

The server 104, in some examples, may include a web search engine used to find references within the Internet, a phone book type search engine used to find businesses or individuals, or another specialized search engine (e.g., a search engine that provides references to entertainment listings such as restaurants and movie theater information, medical and pharmaceutical information, etc.). During state (h), the server 104 provides the file 116 that references the search results 131 to the mobile device 102.

Once both transcriptions, 115*a* and 118, are available to the mobile device 102, during state (i) the mobile device 102 determines the appropriate response. Several possibilities exist. In a first example, the ASR engine 105 may return a transcription and search query results 116 because it is unsure if the second transcription 115*a* is an action or a query, as noted in the third possibility described above, while ASR engine 114 on mobile device 102 may return an action (i.e. "call Alex Gruenstein"). The mobile device 102 will examine both results. If the second transcription 115*a* from ASR engine 105 contains a word or phrase that matches an action from a predefined set of terms and if that action matches the action described in first transcription 118, the mobile device 102 will prefer first transcription 118, the result from ASR engine 114. In doing so the mobile device is employing the comprehensive language model 125 in ASR engine 105 to confirm the action transcribed by ASR engine 114 in first transcription 118 and employing the user-specific data 128 available to ASR engine 114 to produce an accurate transcription of any unique user-specific words such as contact names. Therefore, the result may be an effective use of the attributes of each ASR engine to improve the overall speech recognition accuracy of the mobile device 102.

In this case, the mobile device 102 determines that a portion of the second transcription 115*a* includes a term associated with an action and the associated action is identical to the action returned by ASR engine 114 ("call"). The remaining portion of the second transcription 115*a* ("another pine") is not usable with the action described. Such a result may occur because the language model 125 does not have access to certain user-specific words or names contained in user-specific data 128 (e.g. contact names). In such a case, second transcription 115*a* confirms the type of action returned by ASR engine 114, but has mis-transcribed relevant information (for example, contact name) to carry out the action. The ASR engine 114 returned the same action and matched the action with a contact name contained in user-specific data 128. Thus, the action returned by the ASR engine 114 is performed by mobile device 102. This example is the one depicted in FIG. 1.

In a second example, both ASR engines 105 and 114 may return the action "call Alex Gruenstein." Because both results match either may be chosen. However, the result from ASR engine 105 may generally be preferred out of deference to its complex language model 125.

In a third example, ASR engine 105 may return the search query "pictures of the golden gate bridge" while the ASR engine 114 returns "call Alex Gruenstein." In this case the query result may be preferred because the complex language model 125 may be more accurate at distinguishing common speech patterns.

If the mobile device 102 has chosen a preferred transcription, it may display the action determined along with a confirmation 130 of that action on user interface 101. In addition, search results 131 determined by the search query performed using server transcription 115*b* may be displayed. Alternatively, if the mobile device 102 has a high confidence that the transcription is an action it may initiate the action without user confirmation. Further, initiating the action without user confirmation may be performed with some but not all actions. For example, "play Lynyrd Skynyrd Sweet Home Alabama" may be initiated once detected as an action by the mobile device 102, but "call Alex Gruenstein" may always require confirmation by the user regardless of a confidence level. Such a method may be preferred because any mistake as to playing the incorrect song is a mere inconvenience to the user while calling the wrong person may be embarrassing. Similarly, if the mobile device 102 determines with a high confidence that the correct result is a search query it may only display the search results 116. In any of the above examples, however, the user may be provided with a list of the possible transcriptions from both ASR engines 105 114 and asked to confirm the proper result.

Figure 2:
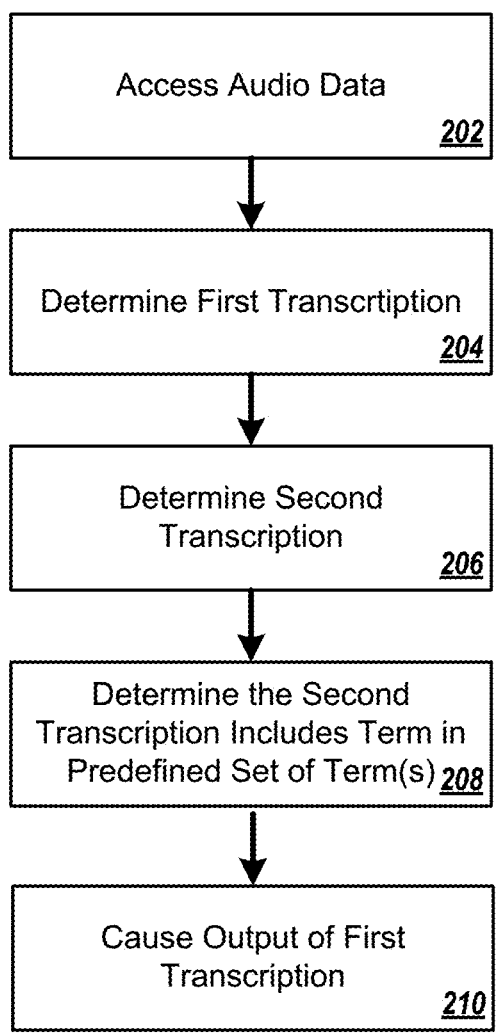
FIG. 2 is a flowchart showing an example of a process for performing speech recognition.

FIG. 2 is a flowchart showing an example of a process 200 for performing speech recognition. Briefly, the process 200 includes accessing audio data generated by a mobile device based on audio input from a user, the audio data encoding one or more user utterances, determining a first transcription of the utterances by performing speech recognition on the audio data using a first speech recognizer, wherein the first speech recognizer employs a language model that is developed based on user-specific data, determining a second transcription of the utterances by performing speech recognition on the audio data using a second speech recognizer, wherein the second speech recognizer employs a language model developed independent of user-specific data, determining that the second transcription of the utterances includes a term from a predefined set of one or more terms, and causing an output of the first transcription of the utterance based on determining that the second transcription of the utterance includes the term from the predefined set of one or more terms.

In more detail, when process 200 begins, audio data that encodes an utterance received by a mobile device is generated (202). The utterance may include a voice command, a voice search query, or may be an input to a dictation or dialog application or system.

A first transcription of the utterances is determined by a first speech recognizer performing speech recognition on the audio data (204). The first speech recognizer employs a language model developed based on user-specific data. For example, user-specific data may be used to aid the first speech recognizer in transcribing unique words associated with the user-specific data. In another example the first speech recognizer may employ a grammar-based language model, such as a context-free grammar. The grammar-based language model may include a set of one or more terms associated with one or more actions to be performed by the mobile device. The user-specific data may include, as an example, a contact list for the user, an applications list of applications installed on the mobile device, or a media list of media stored on the mobile device. As well, the first speech recognizer may be implemented on a mobile device, one or more server devices, a personal computer, a tablet computer, or any other computing device.

A second transcription of the utterances is determined by a second speech recognizer performing speech recognition on the audio data (206). The second speech recognizer employs a language model independent of user-specific data stored on the mobile device. As noted above, this may be because of privacy concerns or system limitations. In an example, the second speech recognizer may employ a statistics-based language model. Furthermore, the statistics-based language model may incorporate a large vocabulary. The second speech recognizer may be implemented on one or more server devices, personal computers, or any other computing device capable of implementing it. Also, as noted above, action (204) and (206) may be carried out on separate computing devices, such as a mobile device and a server as shown in FIG. 1, on any combination of computing devices, or on a single computing device.

The second transcription of the utterances is determined to include a term from a predefined set of one or more terms (208). The text of the second transcription may be searched for a term contained in a pre-defined set of one or more terms that describe an action performable by a mobile device.

An output of the first transcription of the utterance is outputted based on the determination that the second transcription of the utterance includes a term from the pre-defined set of one or more terms (210). The decision to output the first transcription may include determining that the first transcription indicated an action performable by the mobile device and using the term determined in action (208) to be included in the second transcription to confirm the action indicated by the first transcription. Further, the first transcription may be used to provide an accurate representation of a word or phrase included in the utterance which is unique to the user-specific data, such as the name of a contact.

Outputting the first transcription may include, for example, providing the user with the first transcription and requesting user confirmation that the transcription is accurate before initiating performance of the action described by the first transcription. Alternatively, outputting the first transcription may include initiating performance of the action described by the first transcription. In another example, outputting the first transcription may include displaying both the first and second transcription and requesting confirmation from the user of the correct transcription. A search may be performed based on the second transcription producing search results. As a result both the first transcription and the search results from the search performed based on the second transcription may be outputted. Both the first transcription and the search results from the search performed based on the second transcription may be outputted to the user but displayed in separate interface elements. Additionally, the interface element displaying the output of the first transcription may be configured to receive a user selection of that interface element where such a user selection would cause the mobile device to perform the action described by the first transcription.

Figure 3:
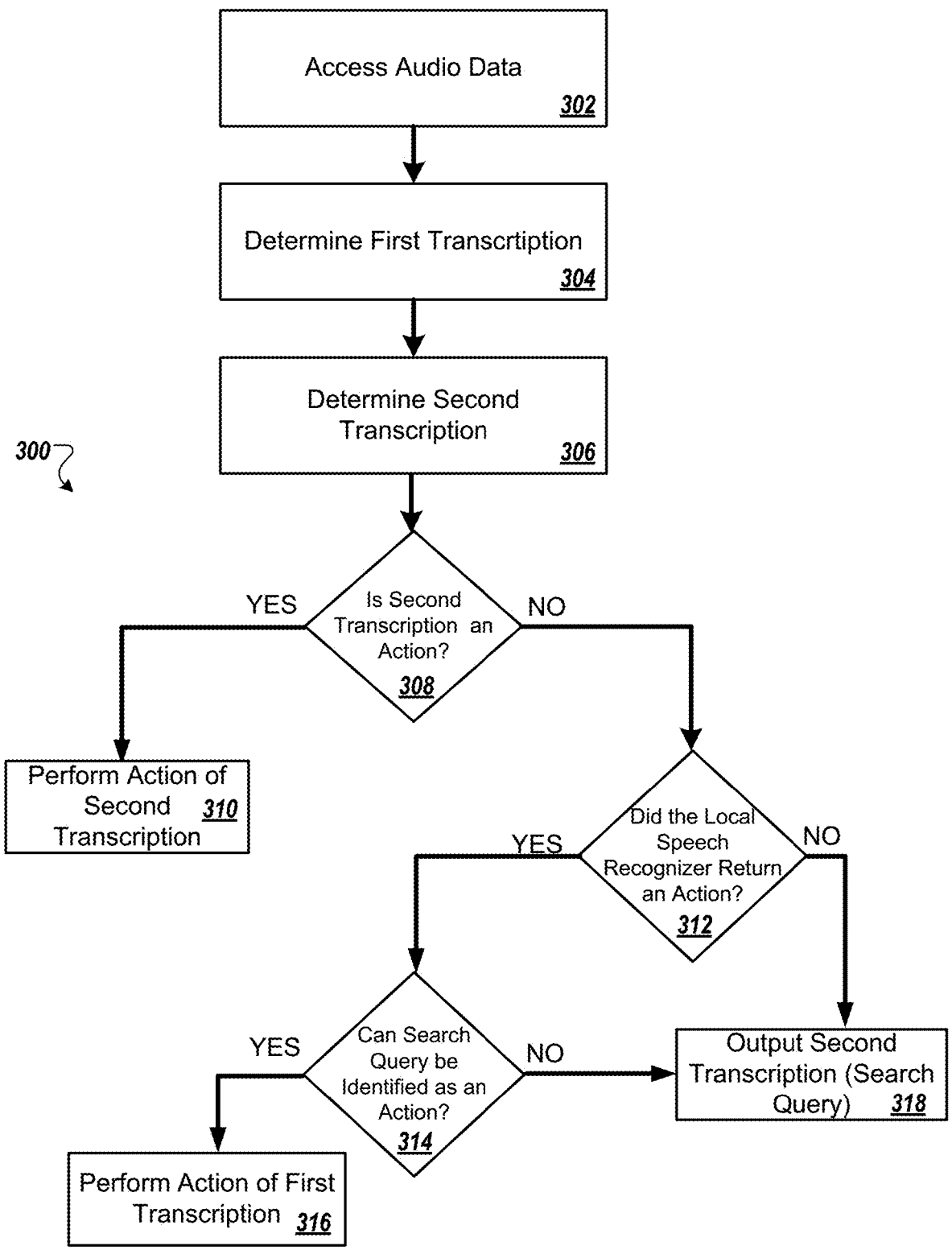
FIG. 3 is a flowchart showing an example of another process for performing speech recognition.

FIG. 3 is a flowchart showing an example of another process 300 for performing speech recognition. The process 300 is described as being performed by system 100, but other systems or configurations may perform process 300.

As described above, ASR engine 105 may make a preliminary determination regarding whether transcription 115a is an action or a query (state (e) of FIG. 1) and may communicate the transcription 115a to the mobile device 102 as either a voice command, a query, or as undetermined.

The mobile device 102 encodes an utterance 112 to generate audio data 113. Once the utterance 112 is encoded, the audio data 113 is communicated to each of the speech recognizers 124 and 126 incorporated in ASR engine 105 and 114, respectively. ASR engine 105 and ASR engine 114 then each access the audio data (302).

Client-based speech recognizer 126 incorporated in ASR engine 114 determines a first transcription 118 of the audio data 113 (304). The server-based speech recognizer 124 incorporated in ASR engine 105 determines a second transcription 115a of the audio data 113 (306).

The mobile device 102 examines the second transcription 115a determined by the server-based speech recognizer 124 and determines if the server-based speech recognizer 124 returned an action (308). If so, (310) the mobile device 102 performs the returned action. In implementations, the mobile device 102 may display the action to be performed to the user 110 and request confirmation before performing the action. If the second transcription 115a is not an action, then the second transcription 115a may be considered a search query or simply a transcription with an uncertain preliminary designation as discussed above.

The mobile device examines the first transcription 118 from the client-based speech recognizer 126 to determine if the first transcription is an action (312). If the first transcription 118 from the client-based speech recognizer 126 was an action, then the mobile device 102 examines the text of the second transcription 118 from the server-based speech recognizer 124 to determine if the search query may be identified as an action (314). To make this determination, the mobile device 102 may search the text of the second transcription 115a for words or phrases in a pre-defined list which indicate an action performable by the mobile device 102. For example, text such as "call," "please call," "call . . . at home," or "dial" may be used to indicate the action of initiating a telephone call.

If the search query does contain a word or phrase from a pre-defined list indicating an action performable by the mobile device 102, then the mobile device 102 may prefer the first transcription and therefore perform the action of the first transcription 118 (316). Doing so may leverage the strengths of the two different types of voice recognizers. The language model 125 of the server-based speech recognizer 124 may be used to confirm the action indicated by the client-based 126 speech recognizer while taking advantage of the client-based speech recognizer's 126 access to users-specific data 128 to produce an accurate transcription of words or phrases unique to that data. In some implementations, the mobile device 102 may display the action to be performed to the user 110 and request confirmation before performing the action.

If the search query does not contain words or phrases that match the pre-defined list of terms, then the user utterance 112 is not considered to be an action, but instead considered to be a search query. In this case, the second transcription 115a is preferred and search results 116 from a search based on that transcription are presented to the user 110 (318). Similarly, if the first transcription 118 was not an action (312), the second transcription 115a is preferred and search results 116 from a search based on that transcription are presented to the user 110 (318). In either case, if search results 116 have not yet been received from a server 104, the mobile device 102 may request a search query from a server 104 using the second transcription 115b and display the results to the user 110.

Figure 4:
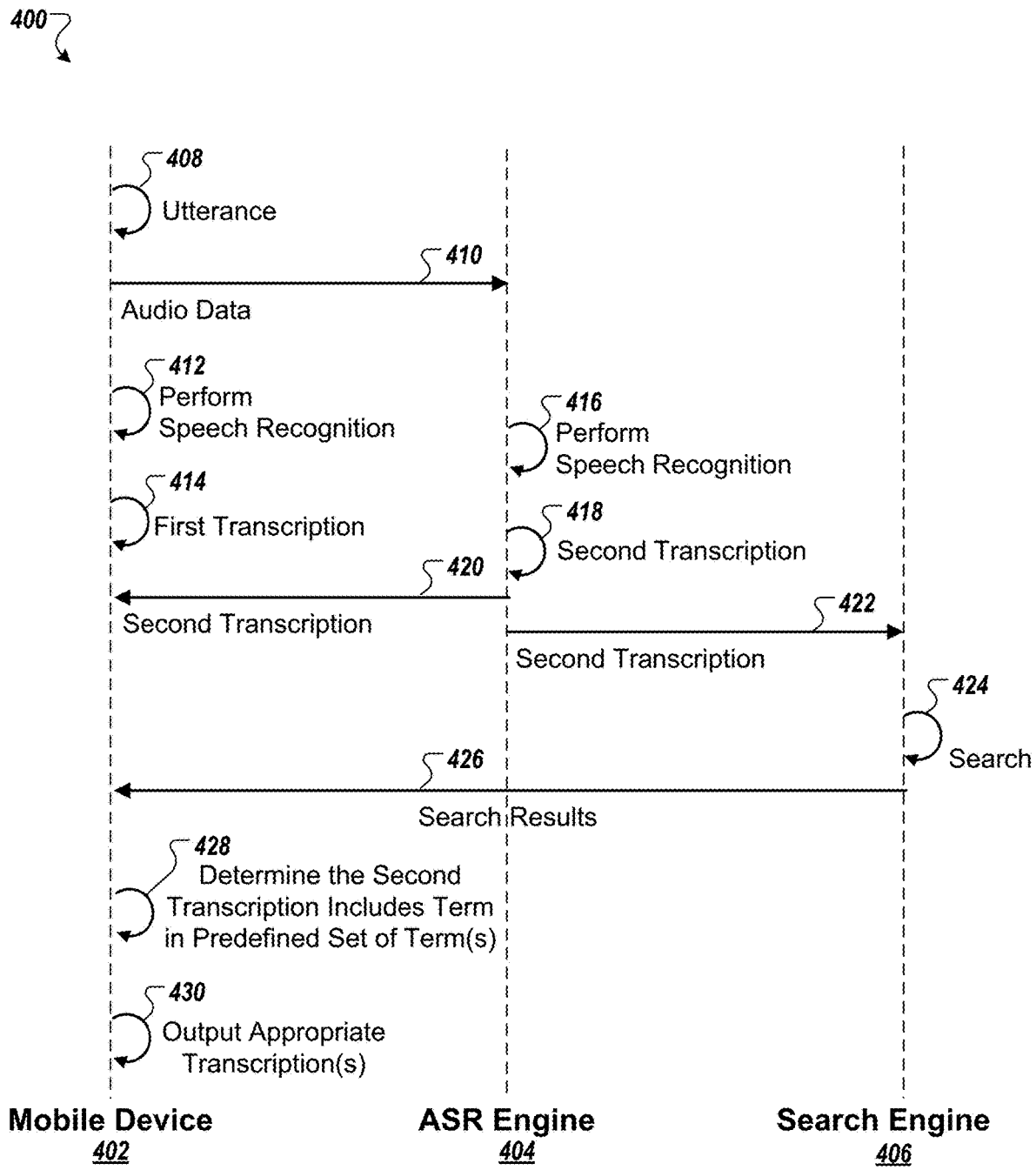
FIG. 4 is a swim lane diagram showing an example of communications and operations while performing speech recognition.

FIG. 4 is a swim lane diagram showing an example 400 of communications and operations while performing speech recognition. The process 400 may be implemented by a mobile device 402 with a local ASR engine having access to user-specific data, a second ASR engine 404 independent of user-specific data, and a search engine 406. The mobile device 402 may provide audio data that corresponds to an utterance to both its local ASR engine and the second ASR engine 404. Although only one mobile device 402 is illustrated, the mobile device 402 may represent a large quantity of mobile devices 402 contributing audio data.

The mobile device 402 receives an utterance from a user and generates audio data from the utterance (408). The utterance, for example, may include a voice command or a search query. The recording of the utterance may optionally include a sample of audio, for example recorded briefly before or after the recording of the utterance.

The mobile device 402 sends the audio data (410) to the second ASR engine 404, which receives the audio data. The local ASR engine implemented on the mobile device 402 performs speech recognition on the audio data (412) and, as a result, determines a first transcription (414).

Simultaneously, at substantially the same time, or in a parallel manner to the speech recognition performed by the local ASR engine implemented on the mobile device 402, ASR engine 404 performs speech recognition on the audio data (416) and, as a result, determines a second transcription (418). In addition the ASR engine 404 may classify the second transcription as an action relating to a voice command, text for a search query, or leave the transcription unclassified. In the example described in FIG. 4, the ASR engine 404 is uncertain as to the proper classification of the utterance and leaves the second transcription unclassified.

The ASR engine sends the second transcription (420) to the mobile device 402 and sends the second transcription (422) to the search engine 406, each of which receive the second transcription.

The search engine 406 performs a search using the second transcription as a search query (424). The search may be a web search, an address search, a telephone directory search, a map search, or any other type of search. The search engine 406 may execute one or more search queries using the second transcription, and may generate a file that references search results. The file may be a markup language file, such as an eXtensible Markup Language (XML) or HyperText Markup Language (HTML) file. The search engine 406 then sends the search results (426) to the mobile device 402, which receives the search results.

The mobile device 402 determines that the second transcription includes a term or phrase that is included in a pre-defined set of terms which describe an action performable by the mobile device 402 (428). In making this determination, the mobile device 402 may also determine that the first transcription indicated an action performable by the mobile device 402. In addition, the mobile device 402 may use the second transcription to confirm the action indicated by the first transcription. Further, the mobile device 402 may use the first transcription to provide an accurate representation of a word or phrase included in the utterance which is unique to the user-specific data.

The mobile device 402 outputs the appropriate transcription (430). This may include initiating performance of the action as described by the first transcription; displaying a user selectable interface element indicating to the user the action as described by the first transcription and awaiting a user input confirming performance of the action; displaying, along with the user selectable interface element, in a second user selectable interface the list of search results provided by search engine 406; or displaying both first and second transcription and requesting, form the user, confirmation of the correct transcription, the correct action, or both. Many other combinations of outputting the results of the first and second transcription to the user are possible.

Figure 5:
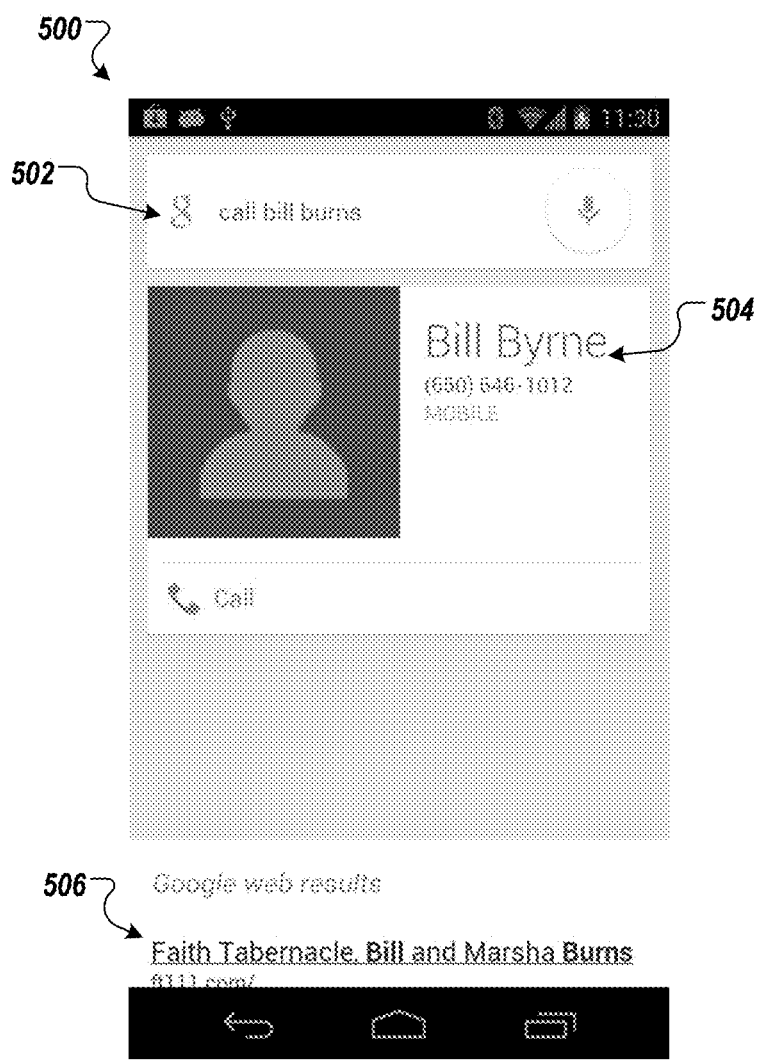
FIG. 5 is a diagram showing an example of a screen shot.

FIG. 5 is a diagram showing an example of a screen shot 500, for example, on mobile device 102. The diagram 500 is described as a specific example of an output generated by system 100, but other displays or configurations may be used to display output form system 100 to the user.

Upper display section 502 displays a transcription to the user. This section 502 may display the first transcription 118, the second transcription 115a, or a user selectable list of both transcriptions for user confirmation.

Middle display section 504 is a user selectable interface displaying the action interpreted by the mobile device 102 from the first transcription 118 of the user utterance 112. It displays the information associated with a contact from the user-specific data 128 stored on the mobile device based on the first transcription 118 of the utterance 112 and generated by the client-based speech recognizer 126 that has access to the user-specific data 128. As shown, middle display section 504 may include all appropriate data related to the contact, for example, the contact's name, telephone number, and a digital photo. Along with the contact information displayed, a confirmation of the action "call" is displayed in the bottom with a telephone icon prompting the user to touch that portion of the display to initiate performance of the action, in this case calling Bill Byrne.

Lower display section 506 shows a list of user selectable search results 116 based on a search performed using the second transcription 115b. This list may be scrollable upon an appropriate input by the user to display a more complete list of the search results. Alternatively, a user's selection of lower display section 506 may cause section 506 to enlarge and encompass the entire screen in order to provide the user with selectable links and a more complete view of the search results 116.

Figure 6:
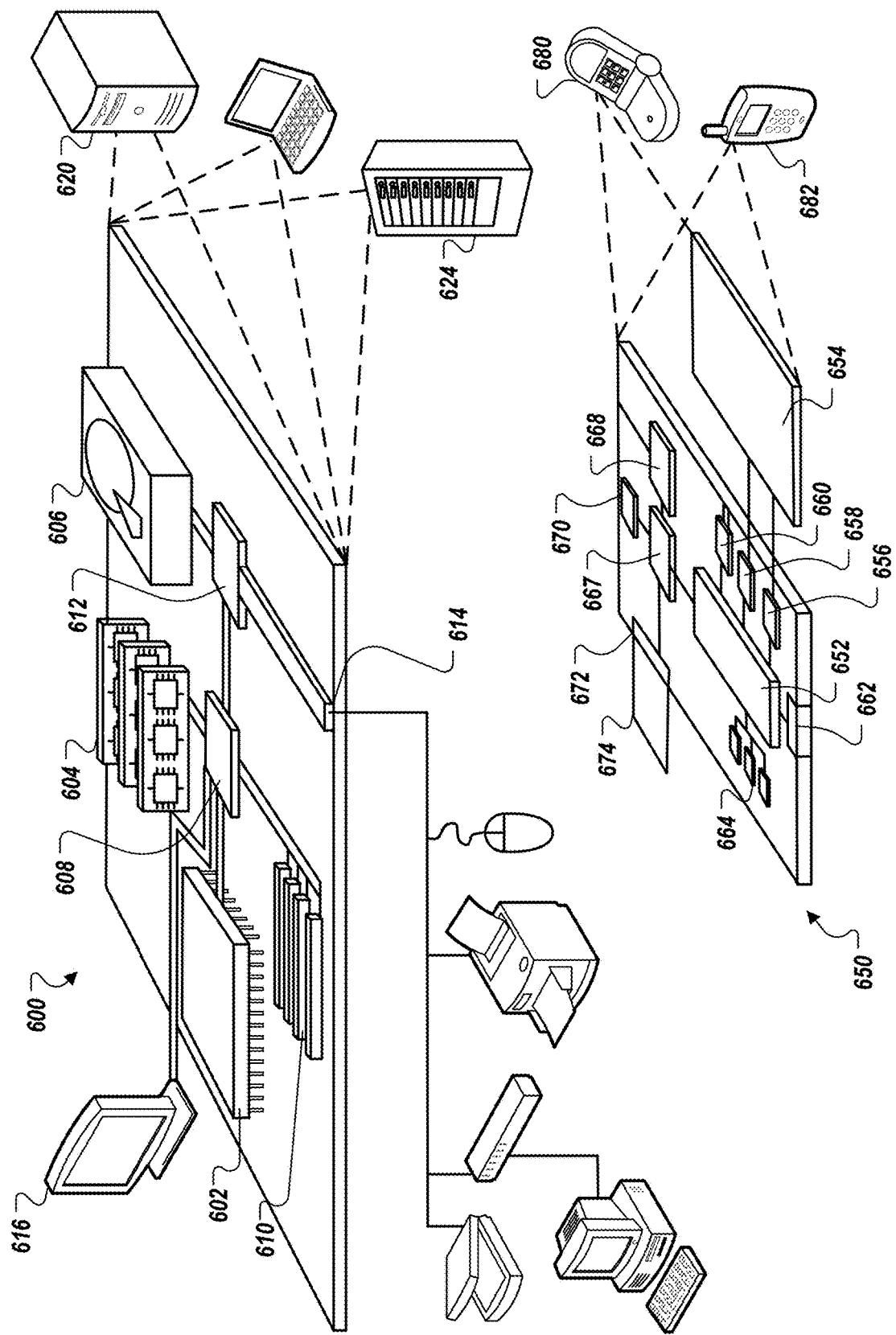
FIG. 6 shows an example of a generic computing device and a generic mobile computing device.

FIG. 6 shows an example of a generic computing device 600 and a generic mobile computing device 650, which may be used with the techniques described here. For example, the computing devices may support either one or both of the ASR engines described. The computing devices may use the ASR engine(s) for multiple purposes, for example, operating as a server to provide transcriptions to other devices or generating transcriptions for use locally on the computing device itself.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device, such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 667, and a transceiver 668, among other components. The device 650 may also be provided with a storage device, such as a microdrive or other device, to provide additional storage. Each of the components 650, 652, 664, 654, 667, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 667, which may include digital signal processing circuitry where necessary. Communication interface 667 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to certain tactile input layouts, but other various layouts may also be used.

In addition, the logic flows depicted in the figures do not necessarily require the particular order shown, or sequential order, to achieve desirable results. In addition, other actions may be provided, or actions may be eliminated, from the described flows, and other components may be added to, or removed from, the described systems. Accordingly, other embodiments are within the scope of the following claims.

What is claimed is:

1. A computer-implemented method comprising:
receiving, by a mobile computing device or a digital assistant device, audio data corresponding to an utterance of a user;
generating, by an automated speech recognizer implemented on the mobile computing device or the digital assistant device that has a vocabulary that includes one or more terms that are not included in a vocabulary of a cloud-based automated speech recognizer, a personalized transcription associated with a voice action performable by the mobile computing device or the digital assistant device, the personalized transcription including one or more of the one or more terms that are not included in the vocabulary of the cloud-based automated speech recognizer;
transmitting, by the mobile computing device or the digital assistant device, the audio data to the cloud-based automated speech recognizer, the cloud-based automated speech recognizer configured to:
  generate a mistranscription of the utterance; and
  transmit the mistranscription of the utterance to the mobile computing device or the digital assistant device;
determining, by the mobile computing device or the digital assistant device, whether the mistranscription of the utterance generated by the cloud-based automated speech recognizer includes a term associated with the voice action performable by the mobile computing device or the digital assistant device; and
when the mistranscription of the utterance generated by the cloud-based automated speech recognizer includes the term associated with the voice action performable by the mobile computing device or the digital assistant device, providing, for output by the mobile computing device or the digital assistant device, a search results page that includes (i) a control for initiating the voice action that is associated with the personalized transcription, and (ii) one or more search results that are generated based on the mistranscription of the utterance generated by the cloud-based automated speech recognizer.

2. The method of claim 1, wherein the one or more terms that are not included in the vocabulary of the cloud-based automated speech recognizer comprise contact names that are not synced to the cloud.

3. The method of claim 1, wherein the one or more terms that are not included in the vocabulary of the cloud-based automated speech recognizer comprise names of applications installed on the mobile computing device.

4. The method of claim 1, further comprising generating, by a search engine associated with the cloud-based automated speech recognizer, the one or more search results using one or more terms of the mistranscription of the utterance as query terms.

5. The method of claim 1, wherein the vocabulary of the cloud-based automated speech recognizer is larger than the vocabulary used by the automated speech recognizer implemented on the mobile computing device.

6. The method of claim 1, wherein the control for initiating the voice action that is associated with the personalized transcription is provided for output after determining that a speech recognition confidence score associated with the personalized transcription does not satisfy a minimum confidence threshold.

7. A system comprising one or more computers and one or more storage devices storing instructions that are operable, when executed by the one or more computers, to cause the one or more computers to perform operations comprising:
  receiving, by a mobile computing device or a digital assistant device, audio data corresponding to an utterance of a user;
  generating, by an automated speech recognizer implemented on the mobile computing device or the digital assistant device that has a vocabulary that includes one or more terms that are not included in a vocabulary of a cloud-based automated speech recognizer, a personalized transcription associated with a voice action performable by the mobile computing device or the digital assistant device, the personalized transcription including that includes one or more of the one or more terms that are not included in the vocabulary of the cloud-based automated speech recognizer;
  transmitting, by the mobile computing device or the digital assistant device, the audio data to the cloud-based automated speech recognizer, the cloud-based automated speech recognizer configured to:
    generate a mistranscription of the utterance; and
    transmit the mistranscription of the utterance to the mobile computing device or the digital assistant device;
  determining, by the mobile computing device or the digital assistant device, whether the mistranscription of the utterance generated by the cloud-based automated speech recognizer includes a term associated with the voice action performable by the mobile computing device or the digital assistant device; and
  when the mistranscription of the utterance generated by the cloud-based automated speech recognizer includes the term associated with the voice action performable by the mobile computing device or the digital assistant device, providing, for output by the mobile computing device or the digital assistant device, a search results page that includes (i) a control for initiating the voice action that is associated with the personalized transcription, and (ii) one or more search results that are generated based on the mistranscription of the utterance generated by the cloud-based automated speech recognizer.

8. The system of claim 7, wherein the one or more terms that are not included in the vocabulary of the cloud-based automated speech recognizer comprise contact names that are not synced to the cloud.

9. The system of claim 7, wherein the one or more terms that are not included in the vocabulary of the cloud-based automated speech recognizer comprise names of applications installed on the mobile computing device.

10. The system of claim 7, wherein the operations further comprise generating, by a search engine associated with the cloud-based automated speech recognizer, the one or more search results using one or more terms of the mistranscription of the utterance as query terms.

11. The system of claim 7, wherein the vocabulary of the cloud-based automated speech recognizer is larger than the vocabulary used by the automated speech recognizer implemented on the mobile computing device.

12. One or more non-transitory computer-readable storage devices storing instructions executable by one or more computers which, upon such execution, cause the one or more computers to perform operations comprising:
  receiving, by a mobile computing device or a digital assistant device, audio data corresponding to an utterance of a user;
  generating, by an automated speech recognizer implemented on the mobile computing device or the digital assistant device that has a vocabulary that includes one or more terms that are not included in a vocabulary of a cloud-based automated speech recognizer, a personalized transcription associated with a voice action performable by the mobile computing device or the digital assistant device, the personalized transcription including that includes one or more of the one or more terms that are not included in the vocabulary of the cloud-based automated speech recognizer;
  transmitting, by the mobile computing device or the digital assistant device, the audio data to the cloud-based automated speech recognizer, the cloud-based automated speech recognizer configured to:
    generate a mistranscription of the utterance; and transmit the mistranscription of the utterance to the mobile computing device or the digital assistant device;

determining, by the mobile computing device or the digital assistant device, whether the mistranscription of the utterance generated by the cloud-based automated speech recognizer includes a term associated with the voice action performable by the mobile computing device or the digital assistant device; and when the mistranscription of the utterance generated by the cloud-based automated speech recognizer includes the term associated with the voice action performable by the mobile computing device or the digital assistant device, providing, for output by the mobile computing device or the digital assistant device, a search results page that includes (i) a control for initiating the voice action that is associated with the personalized transcription, and (ii) one or more search results that are generated based on the mistranscription of the utterance generated by the cloud-based automated speech recognizer.

13. The one or more non-transitory computer-readable storage devices of claim 12, wherein the one or more terms that are not included in the vocabulary of the cloud-based automated speech recognizer comprise contact names that are not synced to the cloud.

14. The one or more non-transitory computer-readable storage devices of claim 12, wherein the one or more terms that are not included in the vocabulary of the cloud-based automated speech recognizer comprise names of applications installed on the mobile computing device.

15. The one or more non-transitory computer-readable storage devices of claim 12, wherein the operations further comprise generating, by a search engine associated with the cloud-based automated speech recognizer, the one or more search results using one or more terms of the mistranscription of the utterance as query terms.

16. The method of claim 1, wherein the utterance of the user is an utterance of a name of a person;
    wherein the personalized transcription is the name of the person; and
    wherein the mistranscription is not the name of the person.

17. The method of claim 1, wherein the one or more search results comprise a search result that specifies an Internet resource identified using the mistranscription of the utterance.

18. The method of claim 1, wherein the personal transcription is generated by the automated speech recognizer implemented on the mobile computing device or the digital assistant device using a first language model that includes user-specific information for the user; and
    wherein the second language model is generated by the cloud-based automated speech recognizer using a second language model that does not include user-specific information for the user.

* * * * *